(12) United States Patent
Dhingra et al.

(10) Patent No.: US 12,333,574 B2
(45) Date of Patent: Jun. 17, 2025

(54) METHOD AND SYSTEM FOR MULTI-CHANNEL DIGITAL COMMUNICATION MANAGEMENT

(71) Applicant: Klaviyo Inc., Boston, MA (US)

(72) Inventors: Sonal Dhingra, Boston, MA (US); Paul Haddad, Boston, MA (US); Noel Keener, Boston, MA (US); James Rosenthal, Boston, MA (US); Jack Carrubba, Boston, MA (US); Moti Green, Boston, MA (US); Kelvin Perez, Boston, MA (US)

(73) Assignee: Klaviyo Inc., Boston, MA (US)

( * ) Notice: Subject to any disclaimer, the term of this patent is extended or adjusted under 35 U.S.C. 154(b) by 117 days.

(21) Appl. No.: 18/324,962

(22) Filed: May 27, 2023

(65) Prior Publication Data

US 2024/0394752 A1    Nov. 28, 2024

(51) Int. Cl.
  *G06Q 30/0242* (2023.01)
  *G06Q 30/0241* (2023.01)

(52) U.S. Cl.
  CPC ..... *G06Q 30/0276* (2013.01); *G06Q 30/0242* (2013.01)

(58) Field of Classification Search
  CPC .............. G06Q 30/0242; G06Q 30/0276
  See application file for complete search history.

(56) References Cited

U.S. PATENT DOCUMENTS

| | | | |
|---|---|---|---|
| 6,424,997 B1 | 7/2002 | Buskirk, Jr. et al. | |
| 6,871,236 B2 | 3/2005 | Fishman et al. | |
| 8,417,269 B1 | 4/2013 | Lin | |
| 8,606,655 B2 * | 12/2013 | Allen | G06Q 30/02 705/26.1 |
| 8,751,327 B2 | 6/2014 | Park et al. | |
| 10,078,854 B1 | 9/2018 | Minks-Brown | |
| 11,144,980 B2 | 10/2021 | Fredrich et al. | |
| 11,936,808 B2 * | 3/2024 | McCann | H04M 3/5233 |
| 2004/0150518 A1 | 8/2004 | Phillips et al. | |
| 2006/0031337 A1 | 2/2006 | Kim | |
| 2007/0260519 A1 | 11/2007 | Sattley et al. | |
| 2008/0307010 A1 | 12/2008 | Cullison et al. | |
| 2009/0037253 A1 | 2/2009 | Davidow et al. | |
| 2009/0199229 A1 | 8/2009 | Gupta et al. | |
| 2013/0226691 A1 | 8/2013 | Chatow et al. | |
| 2014/0074595 A1 | 3/2014 | Chomsky et al. | |
| 2014/0120864 A1 | 5/2014 | Manolarakis et al. | |
| 2014/0372227 A1 | 12/2014 | Gausebeck et al. | |

(Continued)

*Primary Examiner* — Azam A Ansari
(74) *Attorney, Agent, or Firm* — Batt IP A Law Corporation; Richard Batt; Brian R. Short

(57) ABSTRACT

Methods and systems for generating and managing a multi-channel digital communication are disclosed. The multi-channel communication system can effectively create a second, interconnected communication based on a first communication. Furthermore, the system can duplicate, modify and adapt content and settings of the second linked communication. The multi-channel communication system can compile individual breakdown reports for the individual communications and can assemble a combined comprehensive report for the multi-channel communication. Additionally, the system can propose modifications and implement adjustments based on the engagement metrics of the combined report.

17 Claims, 11 Drawing Sheets

(56) References Cited

U.S. PATENT DOCUMENTS

| | | |
|---|---|---|
| 2015/0106173 A1 | 4/2015 | O'Donnell et al. |
| 2016/0241502 A1 | 8/2016 | Georgiou |
| 2016/0253704 A1 | 9/2016 | Snyder et al. |
| 2017/0017622 A1* | 1/2017 | Soundararajan .... G06F 3/04842 |
| 2017/0124447 A1 | 5/2017 | Chang et al. |
| 2018/0165723 A1 | 6/2018 | Wright et al. |
| 2019/0043106 A1 | 2/2019 | Talmor et al. |
| 2019/0303378 A1 | 10/2019 | Angle et al. |
| 2019/0373337 A1 | 12/2019 | Martell et al. |
| 2020/0013092 A1 | 1/2020 | Liu et al. |
| 2021/0328965 A1* | 10/2021 | Gorny .................... G06Q 30/02 |
| 2023/0385307 A1 | 11/2023 | White |
| 2024/0394744 A1 | 11/2024 | Dhingra et al. |
| 2024/0394752 A1 | 11/2024 | Dhingra et al. |

* cited by examiner

| First Comm Name 302 | UUID 304 | Channel 306 | Subject 308 | Recipient List 310 | Delivery Rate 312 | Click Rate 314 | Conversion Rate 316 |
|---|---|---|---|---|---|---|---|
| AprilMove | ABC | Email | How to improve | Total Email Receipts (#690) | 98% | 10% | 3.5% |

*FIG. 3A*

| Second Comm Name 322 | UUID 324 | Channel 326 | Subject 328 | Recipient List 330 | Delivery Rate 332 | Click Rate 334 | Conversion Rate 336 |
|---|---|---|---|---|---|---|---|
| AprilMove2 | DEF | SMS | Improve ... | Total SMS Receipts (#250) | 90% | 15% | 5% |

*FIG. 3B*

| Comm Name 352 | UUID 354 | Channel 356 | Subject 358 | Recipient List 360 | Delivery Rate 362 | Click Rate 364 | Conversion Rate 366 |
|---|---|---|---|---|---|---|---|
| AprilMove | ABC | Email | How to improve | Total Email Receipts (#690) | 98% | 10% | 3.5% |
| AprilMove2 | DEF | SMS | Improve ... | Total SMS Receipts (#250) | 90% | 15% | 5% |

*FIG. 3C*

METHOD AND SYSTEM FOR MULTI-CHANNEL DIGITAL COMMUNICATION MANAGEMENT

TECHNICAL FIELD

The present subject matter relates to systems and methods for enhanced digital communication management. More specifically, the present subject matter relates to methods and systems for managing a digital communication across multiple channels.

BACKGROUND

Digital communications are becoming increasingly popular as they are efficient and cost-effective to traditional marketing methods such as newspaper, radio, and TV marketing. Furthermore, digital communications can reach a large and targeted audience. With the various types of digital communications available, the marketer can adopt several communication methods, such as emails and SMS text messages, websites, or social media advertisements, in one communication. Such cross-channel digital communications can offer many unique benefits.

In addition, the cross-channel digital communication can enable better segmentation and targeting, allowing the businesses to create personalized content and offers for specific customer segments, resulting in higher conversion rates and improved customer satisfaction.

For example, by utilizing multiple channels, businesses can reach diversified customer groups with varied ages, demographics, and habits. In addition, businesses can enhance brand awareness by presenting the same products or services across different platforms.

However, businesses also have many challenges in reaching the full potential of cross-channel digital communications. These challenges include, for example, technical complexity as each digital channel management has unique requirements. Another challenge is to generate consistent content for various channels. Furthermore, it is difficult to track and compare the effectiveness of each communication due to scattered data on different platforms. As such, there are areas for improving cross-channel digital communications.

SUMMARY OF THE INVENTION

The present subject matter describes improved methods for multi-channel digital communication systems. Systems and methods in accordance with various embodiments of the present disclosure overcome one or more of the aforementioned and other deficiencies experienced in conventional approaches to managing aspects of a multi-channel digital communication in an electronic environment. In order to efficiently generate and manage such communications, the multi-channel communication system can populate and adjust data for a second communication database by utilizing a first and interconnected communication database, thus improving computing and network efficiency. In order to effectively manage such communications, the multi-channel communication system can generate a combined report based on individually executed communications in various channels. These cross-channel communications are interconnected via a communication link database. According to some embodiments, the system can highlight key engagement metrics in the combined comprehensive report and also propose modifications based on it. According to some embodiments, the system can automatically implement optimization adjustments to one or more of the communications based on the compared engagement metrics.

According to some embodiments, the system can populate and adjust data for a second communication database by utilizing a first and linked communication database. Each database corresponds to a separate communication channel. Furthermore, the system can assign a unique identification number to each communication for efficient management across multiple channels. The communication manager has the flexibility to modify the content and settings of the second communication database as required. Additionally, in alternate embodiments, the system can automatically adjust the content and settings of the second database in accordance with the objectives and demands of the second communication.

According to some embodiments, the multi-channel communication system can generate, at a communication management server, a second communication based on a first communication in the multi-channel communication, wherein each of the first communication and the second communication is associated with a respective communication channel. According to some embodiments, each of the first communication and the second communication can be directed to a different segmentation of the recipients. The system can populate secondary communication data of the second communication based on primary communication data of the first communication. The system can execute, individually, the first communication and the second communication and receive respective performance metrics associated with the first communication and the second communication. The system can generate a combined report for the multi-channel communication based on the respective performance metrics.

According to some embodiments, the system can store the primary communication data in a first communication database and the secondary communication data in a second communication database. The primary communication data and the secondary communication data comprise content and settings. Examples of the content data comprise subject lines, communication content, preview texts, etc. Examples of the setting data comprise communication names, segmentation information, communication tags, sending time, tracking settings, etc. Additionally, in alternate embodiments, the secondary content can comprise secondary preview texts for the second communication. According to some embodiments, the secondary content can comprise a secondary subject line for the second communication.

According to some embodiments, the secondary content generated by the system can be an adaptation of the primary content. For example, an adaptation model associated with the system can generate varied and/or enhanced secondary content based on the primary content. According to some embodiments, an adaptation model can shorten or expand the secondary communication content data from the primary communication data. According to some embodiments, an adaptation model can translate primary communication data in a first language into a second language in a second communication. Additionally, in alternate embodiments, the system can determine important or relevant information from the primary communication data and display it in the secondary communication data. For example, the system can determine an essential link, e.g., an information link or a product link, in the primary communication data and embed it in the secondary communication data.

According to some embodiments, the system can assign a unique identification number to associate with each communication and store it in the corresponding database. The system can create a communication link database configured to store relevant information of the linked, multi-channel communication, e.g., the database identification numbers, the link identification numbers, etc.

For example, the multi-channel communication system can assign a first universal identification number stored in the first communication database for the first communication, assign a second universal identification number stored in the second communication database for the second communication, and generate a database link between the first communication database and the second communication database. The database link can be assigned a link identification number. Furthermore, the system can store the first universal identification number, the second universal identification number, and the link identification number in a communication link database.

According to some embodiments, after individually executing the first communication and the second communication, the multi-channel communication system can generate individual breakdown reports for the first communication and the second communication. The individual breakdown reports can be saved respectively in the first communication database and the second communication database. The system can extract, via the database link, data from the two individual communication databases and generate a combined report for the multi-channel communication.

According to some embodiments, a multi-channel communication system can generate, at a communication management server, a second communication based on a first communication in a multi-channel communication. Each of the first communication and the second communication is associated with a separate communication channel. The system can execute, individually, the first communication and the second communication and compile respective breakdown reports based on the performance metrics of the first communication and the second communication. In addition, the system can generate a combined report for the multi-channel communication. The system can further recommend one or more adjustments to one of the first communications and the second communication.

According to some embodiments, the multi-channel communication system can generate a database link between the first communication database and the second communication database, and assign a link identification number to the database link. Furthermore, the system can store the first universal identification number, the second universal identification number and the link identification number in a communication link database.

According to some embodiments, the multi-channel communication system can compile individual breakdown reports for the first communication and the second communication, wherein the individual breakdown reports are respectively saved in the first communication database and the second communication database. The multi-channel communication system can generate, via the database link, a combined report for the multi-channel communication.

According to some embodiments, a multi-channel communication system can comprise memory storing instructions that are executable, and one or more processing devices to execute the instructions to perform operations comprising: generating a second communication based on a first communication in a multi-channel communication, wherein each of the first communication and the second communication is associated with a respective communication channel, populate secondary communication data of the second communication based on primary communication data of the first communication; executing, individually, the first communication and the second communication; receiving respective performance metrics associated with the first communication and the second communication; and generating a combined report for the multi-channel communication based on the respective performance metrics. According to some embodiments, the linked communication be two or more linked communications.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 3A shows an exemplary database of a first communication, according to one or more embodiments of the present subject matter;

FIG. 3B shows an exemplary database of a second communication, according to one or more embodiments of the present subject matter;

FIG. 3C shows an exemplary database of a multi-channel communication, according to one or more embodiments of the present subject matter;

DETAILED DESCRIPTION

The present subject matter pertains to improved approaches for a multi-channel communication system. Embodiments of the present subject matter are discussed below with reference to FIGS. 1-8.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for efficiently generating a marketing communication across multiple platforms such as emails, Short Message Service (SMS), push notifications, social media and many others. Another type of cross-channel market communication can be one communication in a different language designed for different market regions. Also, a multi-channel market communication can be one communication designated to different segmentation of the recipient group. A cross-platform, multi-channel communication can create a comprehensive and integrated marketing communication that can effectively engage with the target recipients. These can be implemented with computers that execute software instructions stored on non-transitory computer-readable media. An improved multi-channel communication system can have one or more of the features described below.

Figure 1A:
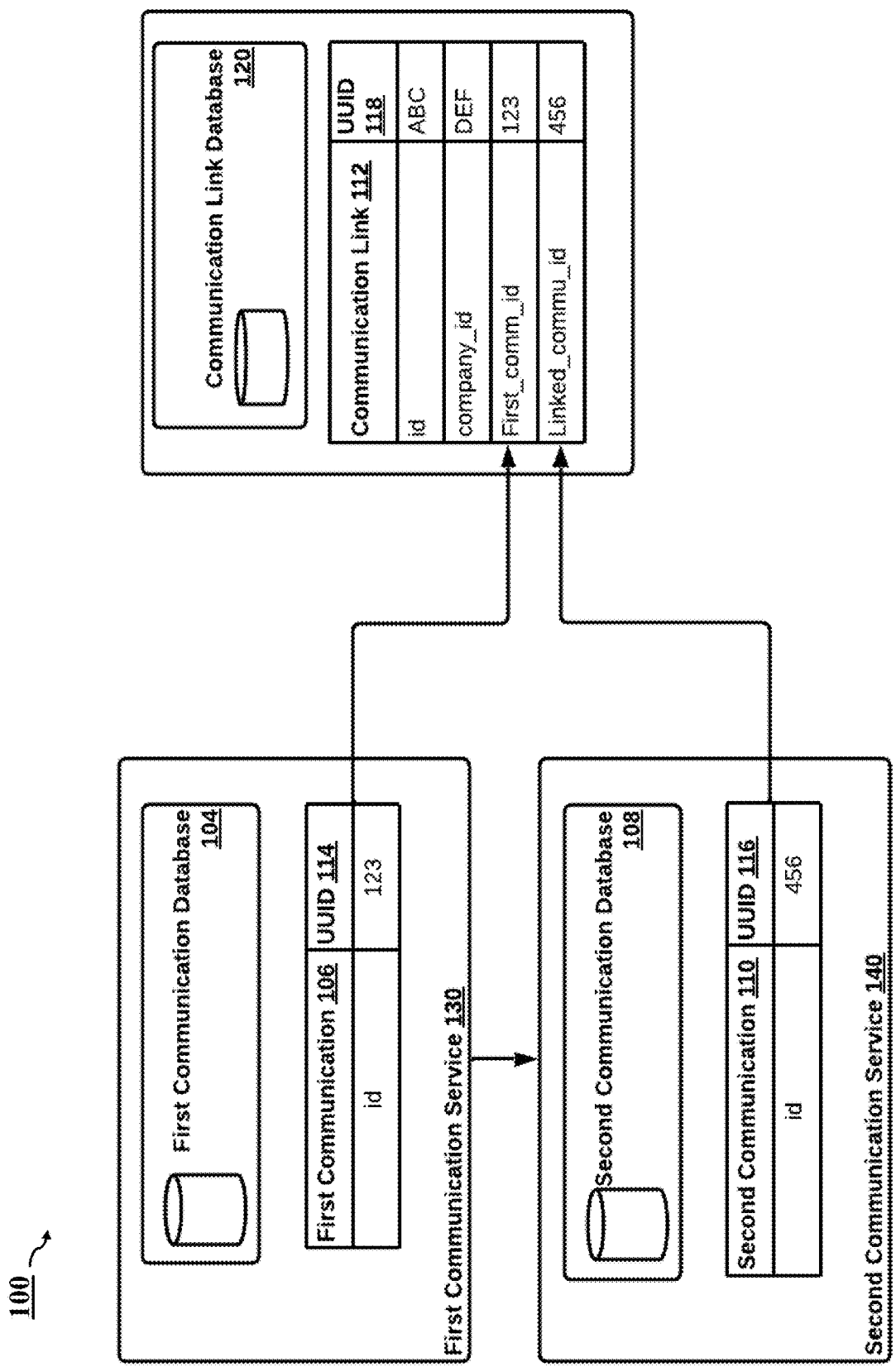
FIG. 1A shows an exemplary database diagram of a multi-channel communication system, according to one or more embodiments of the present subject matter.

FIG. 1A shows an exemplary database diagram of a multi-channel communication system 100, according to one or more embodiments of the present subject matter. A communication channel can refer to various online platforms and mediums used to promote a product, service, or brand. Examples of digital communication channels can comprise the email channel, the mobile channel including SMS and push notifications, the social media channel, etc. Furthermore, a marketing communication that uses multiple channels, i.e., a cross-channel or multi-channel communication, can effectively deliver similar or relevant marketing content across two or more channels simultaneously or at substantially similar time.

As shown in FIG. 1A, a first communication 106 can be an email communication designed to deliver content related to a product or a service to audiences. The first communication 106 can comprise marketing emails that can directly deliver relevant content to a customer. These marketing emails can be generated by modifying a template email according to various factors such as the specific offering or the customer's previous behavior data.

First communication service 130 can be implemented by one or more communication management servers associated with the multi-channel communication system. The communication management server can comprise both the hardware and software components that are involved in providing these communication management services. It can be configured to receive, store, and manage communication data, execute the cross-channel communication, and collect, compile, and analyze the respective communication result data, etc. Frist communication service 130 can comprise first communication database 104 configured to store primary communication data related to the first communication 106. First communication database 104 can comprise one or more relational databases, e.g., MySQL databases.

First communication database 104 can have customized data fields based on the goal of the first communication 106. According to some embodiments, these data fields can include the email title, email content, the recipients' names, email addresses, and engagement metrics such as open rate, click rate, conversion rate, and revenue. In addition, other recipient's data such as a subscriber's preference and interests, or his/her purchase history can be tracked and stored in the first communication database 104. Additionally, in alternate embodiments, first communication 106 can be based on an email template that comprises a computer-compiled HTML web page. According to some embodiments, an email template can comprise a number of components, such as email title, and email content comprising body, sections, rows, columns, blocks, and subblocks. The email template, with its data schemas that define the structure and content of it, can be stored in first communication database 104.

According to some embodiments, when a request is received to initiate a related, secondary communication via a different communication channel, the system can generate corresponding communication data for second communication 110, in a secondary communication service 140. This can be achieved by processing the primary communication data, with the derived secondary data subsequently stored in a separate communication database 108.

According to some embodiments, various techniques can be employed to populate secondary communication data. For instance, the secondary data may be a replica of the primary communication data or a condensed or shortened version of the primary data. Additionally, the system can allow a user to customize the secondary communication data to meet the unique needs of the second communication. For example, an SMS communication can be subject to a word limit per message, as set by the mobile service provider. In this case, the system can autonomously condense or abbreviate the SMS communication content to adhere to this word limit. For example, the system could trim down the content initially prepared for the email communication to fit within the constraints of the SMS content.

Furthermore, the primary communication data can comprise primary content and primary settings, whereas the secondary communication data can comprise secondary content and secondary settings. Communication content can comprise the email title, textual content, images, embedded links, etc. Communication settings can comprise, for example, communication name, recipient tag, communication tag, smart sending setting, tracking setting, etc. According to some embodiments, the system can dynamically adjust the secondary communication settings based on the specific requirements of the second communication. For example, a SMS sending time can be adjusted, either by the system or by the user, pursuant to any available SMS sending time regulations.

According to some embodiments, the system can generate secondary preview texts as the secondary content for the second communication. In addition, for the second communication, the system can generate a secondary subject line based on a primary subject line of the first communication. In an email communication, an email subject line is a brief and descriptive summary of the email's content. It can appear in the recipient's inbox before opening the email. It can serve as an introduction to the email, providing a glimpse of the email's content. Furthermore, a properly created subject line can capture the recipient's attention, increase the open or click rate, and improve overall communication effectiveness.

Furthermore, each of the first communication and the second communication is associated with a respective digital communication channel. A digital communication channel can refer to various online platforms and mediums used to promote a product, service, or brand. Examples of digital communication channels can comprise: the email channel, the mobile channel including SMS and push notifications, the social media channel, etc.

According to some embodiments, both the primary and secondary communications can be tailored to distinct segments of the recipient audience. For example, the primary communication could be targeted at those recipients who have chosen to receive emails but not SMS messages. Conversely, the secondary communication could be aimed at recipients who have opted for SMS communications but not for email notifications.

According to some embodiments, the communication management server can assign a UUID 114 to first communication 106 and a UUID 116 to second communication 110. A Universally Unique Identifier (UUID), is a fixed-bit number used to uniquely identify objects, resources, or entities in computer systems and networks. For example, an exemplary UUID can be 550e8400-e29b-41d4-a716-446655440000. Here, UUIDs can track and associate relevant communications in a multi-channel communication.

As shown in FIG. 1A, the system can further comprise a communication link database 120. The system can generate a database link, e.g., communication link 112, between the first communication database 104 and the second communication database 108. In addition, the database link 112 can be further assigned a link identification number UUID 118. The communication link database 120 can comprise the first communication ID, i.e., UUID 114 and the second communication ID, i.e., UUID 116. All UUID 114, 116 and 118 can be stored in the communication link database 120. Furthermore, communication link database 120 can further store a company ID and other communication-related information.

According to some embodiments, a third or fourth related communication can be generated similar to the second communication, e.g., each related communication can be associated with a separate and linked database, and each communication can be assigned a respective UUID. Furthermore, the communication link database 120 can further comprise the third communication ID, and/or the fourth communication ID.

Figure 1B:
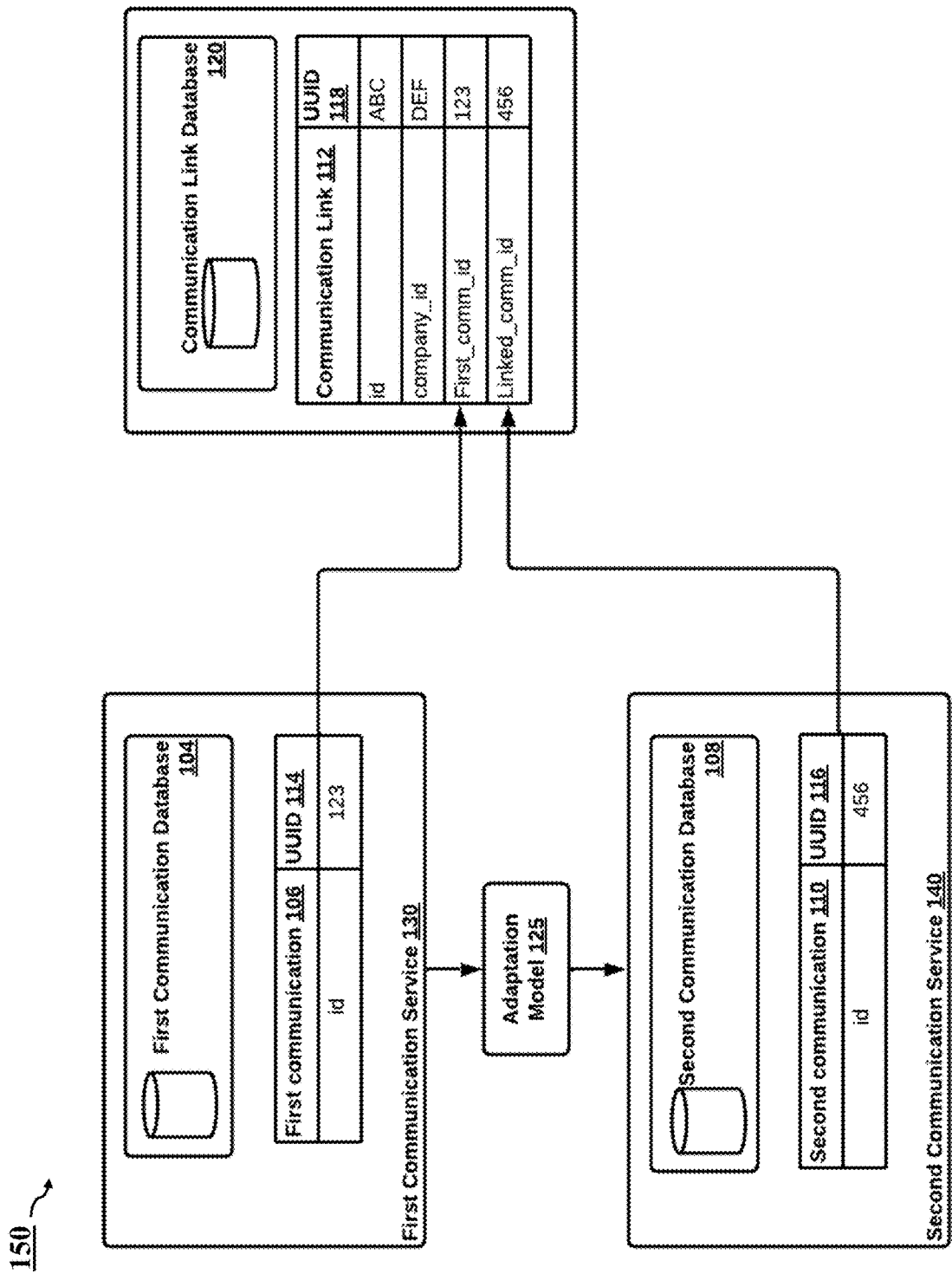
FIG. 1B shows another exemplary database diagram of a multi-channel communication system, according to one or more embodiments of the present subject matter

FIG. 1B shows another exemplary database diagram of a multi-channel communication system 150 comprising an adaption model 125. First communication 106 can be an email communication designed to deliver content related to a product or a service to audiences. First communication service 130 can comprise first communication database 104 configured to store primary communication data related to the first communication 106. First communication database 104 can comprise one or more relational databases.

According to some embodiments, upon receiving a request to create a related, second communication in a different channel, e.g., a SMS channel, the system can populate secondary communication data for a second communication 110 in a second communication service 140 by processing the primary communication data and store such secondary data in a second communication database 108.

According to some embodiments, various techniques can be employed to adjust and generate secondary communication data based on primary communication data. For example, an adaptation model 125 can modify, summarize, and/or change secondary communication data based on primary communication data. Adaptation model 125 can comprise one or more language models, such as transformer-based language models, configured to summarize the primary communication content. According to some embodiments, the adaptation model 125 can tokenize the primary content, and generate vectors based on these tokens for understanding the context. For example, after tokenization, each token can be mapped to a vector embedding. Such vector embedding can be input for the adaption model 125, which can perform various operations such as text classification, summarization, modification, etc.

According to some embodiments, adaption model 125 can be trained by datasets tailored to achieve different goals of the adaptions. For example, training datasets can promote content diversity between the primary content data and the second content data; the training datasets can also realize an abbreviation of the primary content data as the second content data; the training datasets can also determine and select important or preferred portions in the primary content data as the secondary content data.

According to some embodiments, to meet the unique needs of the second communication, adaptation model 125 can automatically shorten or abbreviate the second communication content data, e.g., SMS communication context, based on the word limit of the SMS communication. In addition, the system can allow a user to further customize the adapted secondary communication data, for example, alter or change the content to avoid being overly repetitive.

According to some embodiments, adaptation model 125 can generate adapted secondary preview texts for the second communication. For the second communication, adaptation model 125 can generate an adapted secondary subject line based on a primary subject line of the first communication. In an email communication, the primary subject line is a brief and descriptive summary of the email's content. It can appear in the recipient's inbox before opening the email. It can serve as an introduction to the email, providing a glimpse of the email's content. Furthermore, a properly created subject line can capture the recipient's attention, increase the open or click rate, and improve overall communication effectiveness. The adapted secondary subject line can be shorter than the primary subject line; the adapted secondary subject line can also describe another aspect of the product/service from the primary subject line.

According to some embodiments, adaptation model 125 can identify essential information from the primary communication data and incorporate it in the secondary communication data. For example, the system can determine a crucial link, e.g., an information link or a purchase link, in the primary communication data and embed it in the secondary communication data, while excluding any non-essential data such as a help desk link.

According to some embodiments, adaptation model 125 can translate primary communication data from one language into secondary communication data in another language. According to some embodiments, the adaptation model could be trained using datasets in various languages. Moreover, the adaptation model can be a transformer-based language model. Therefore, communication managers can effectively create multi-channel communications that span across diverse languages and marketing territories.

According to some embodiments, the communication management server can assign a UUID 114 to first communication 106 and a UUID 116 to second communication 110. The system can further comprise a communication link database 120. The system can generate a database link, e.g., communication link 112, between the first communication database 104 and the second communication database 108. In addition, the database link 112 can be further assigned a link identification number UUID 118. The communication link database 120 can comprise the first communication ID, i.e., UUID 114 and the second communication ID, i.e., UUID 116. All UUID 114, 116 and 118 can be stored in the communication link database 120. Furthermore, communication link database 120 can further store a company ID and other communication related information.

According to some embodiments, a third or fourth related communication can be generated similar to the second communication, e.g., each related communication can be associated with a separate and linked database, and each communication can be assigned a respective UUID. Furthermore, the communication link database 120 can further comprise the third communication ID, and/or the fourth communication ID.

Figure 2:
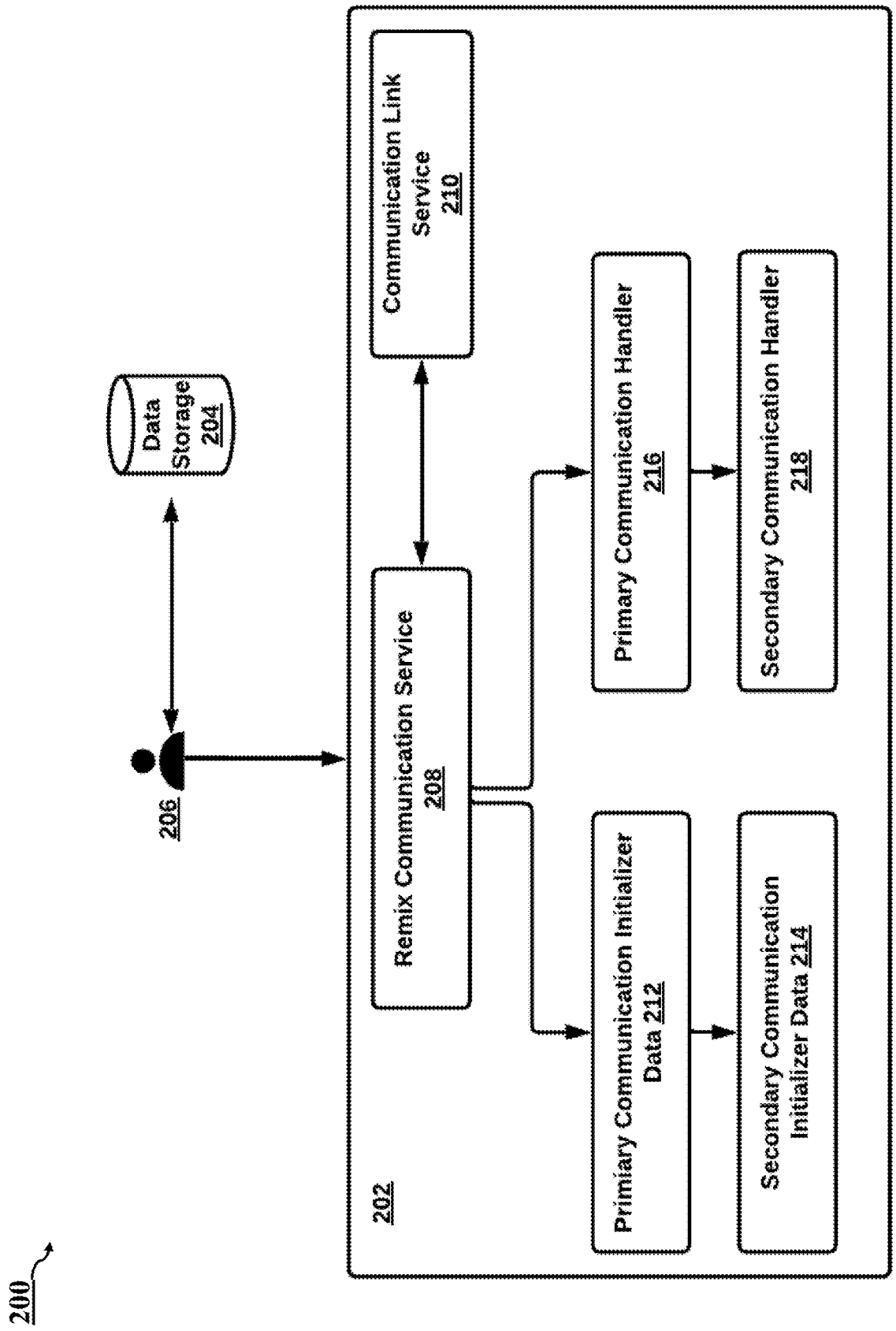
FIG. 2 shows another exemplary diagram of a multi-channel communication system, according to one or more embodiments of the present subject matter.

FIG. 2 shows another exemplary diagram 200 of a multi-channel communication system, according to one or more embodiments of the present subject matter. According to some embodiments, exemplary diagram 200 can illustrate the remix communication service 208 in association with a multi-channel marketing communication. After individually executing the first communication and the second communication in the multi-channel communication, the system can store respective communication data in one or more data storage 204.

Upon receiving a request to generate a combined report for the multi-channel communication, the system can first determine whether the primary communication data of a first communication and the secondary communication data of a second communication can be remixed for the combined report. To achieve this, the system can retrieve remix initializer data, via retrieving the primary communication initializer data 212 and secondary communication initializer data 214. Next, the system can determine whether such retrieved data from the two linked channels can be remixed and combined, for example, the determination process can compare the respective communication content and settings and decide whether they are compatible and comparable. After remix confirmation, the system can call for communication link service 210 for accessing the communication link database. Upon receiving the database link data, e.g., first communication UUID, second communication UUID, and communication link UUID, the system can remix the primary communication data and the second communication data, via implementing primary communication handler 216 and secondary communication handler 218. According to some embodiment, the primary communication handler 216 and the secondary communication handler 218 can respectively retrieve and process the relevant communication data such as engagement metrics including open rate, click rate, conversion rate, and revenue.

According to some embodiments, the first communication can be an email communication and the second communication can be a SMS communication, which jointly constitutes the multi-channel communication. According to some embodiments, each of the first communication and the second communication can be a different communication from a number of available digital communication channels such as emails, SMS, push notifications, social media and many others. According to some embodiments, the two communications can be the same communication executed in different languages for different countries or regions.

FIGS. 3A and 3B show exemplary databases of a first communication and a second communication, according to one or more embodiments of the present subject matter. As shown in FIG. 3A, a first communication database 300 can comprise, for example, data fields such as first communication name 302, UUID 304, channel 306, subject 308, recipient list 310, delivery rate 312, click rate 314, conversion rate 316, etc. In addition, the communication database can further comprise the communication content data such as text, image, link data, as well as additional communication setting data such as delivery time, revenue data, etc.

After the execution of the first communication at its configured delivery time, the system can track and record the engagement metrics of the first communication via various mechanisms. For example, one or more tracking and analytic tools can track the open and click rate of an email or a SMS message over a predetermined amount of time. The engagement metrics can be stored in in first communication database 300. According to some embodiments, for the first communication, the system can generate an individual breakdown report based on first communication database 300 via various database management system (DBMS) such as MySQL. Such a breakdown report can be rendered in a table format similar to the first communication database 300. The breakdown report can also be rendered via other frameworks to visualize data, for example, a bar chart or a line chart breakdown report, or a hybrid of different types.

As shown in FIG. 3B, a second communication database 320 can comprise, for example, data fields such as first communication name 322, UUID 324, channel 326, subject 328, recipient list 330, delivery rate 332, click rate 334, conversion rate 336, etc. After the execution of the second communication at its configured delivery time, the system can track and record the engagement metrics of the second communication via various mechanisms. The engagement metrics can be stored in second communication database 320. According to some embodiments, the system can generate an individual breakdown report for the second communication based on first communication database 320. According to some embodiments, a communication link database as described herein can receive and store the UUID data of both the first communication and the second communication, UUID 304 and 324. Similarly, a breakdown report can be rendered in a table format similar to the second communication database 320, or be rendered via other frameworks to visualize data pursuant to the nature of the data and the specific insights. For example, a bar chart can visualize and show the engagement metrics such as delivery rate, click rate and conversion rate of the second communication. Furthermore, the breakdown report can be customized by a communication manager, e.g., adding or removing certain data fields.

According to some embodiments, upon receiving a request to remix the two linked communications, as shown in FIGS. 3A and 3B, the system can first confirm that the two communication result data can be remixed and combined based on their compatibility. For example, an Email communication and its linked SMS communication or a push notification communication can be remixed because its engagement metrics are similar and comparable. Conversely, an Email communication and its linked video marketing communication are difficult to be compared.

Next, the system can directly extract engagement data from individual communication databases to generate a combined report for the multi-channel communication. For example, the system can access the database link database and determine the two linked databases, e.g., first communication database 300 and second communication database 320, are comparable. Then the system can retrieve the relevant data from these individual databases and generate a combined report. As such, a multi-channel communication database is not necessary as the system can directly access the individual databases related to the multi-channel communication. As such, a combined report of the multi-channel communication can be shown as including both data of FIG. 3A and FIG. 3B. An example of the combined report can be seen at FIG. 3C.

According to some embodiments, FIG. 3C shows an exemplary combined report 350 of the multi-channel communication. The combined report 350 can comprise communication name 352, UUID 354, channel 356, subject 358, recipient list 360, delivery rate 362, click rate 364, and conversion rate 366. Various data fields can be added or removed according to the communication manager's requirements. According to some embodiments, the system can highlight key engagement metrics and also make adjustment suggestions based on the combined report 350. For example, based on a lower-than-expected click rate of the SMS communication, the system can recommend changing the delivery time of the next SMS communication to be ahead of the linked Email communication. In addition, the system can recommend shortening or altering email content when the click rate of an email communication is lower than a predetermined threshold.

According to some embodiments, the system can automatically implement a number of recommended changes in content or settings for the next communications to improve its performance. According to some embodiments, the system can enable a communication manager to select which recommended changes to implement and which ones to disregard.

According to some embodiments, FIG. 3C can also be nonetheless an exemplary combined database of a multi-channel communication. According to some embodiments, the system, after accessing and retrieving the individual databases, can generate a multi-channel communication database that can be used to generate the combined report for the multi-channel communication.

Figure 4A:
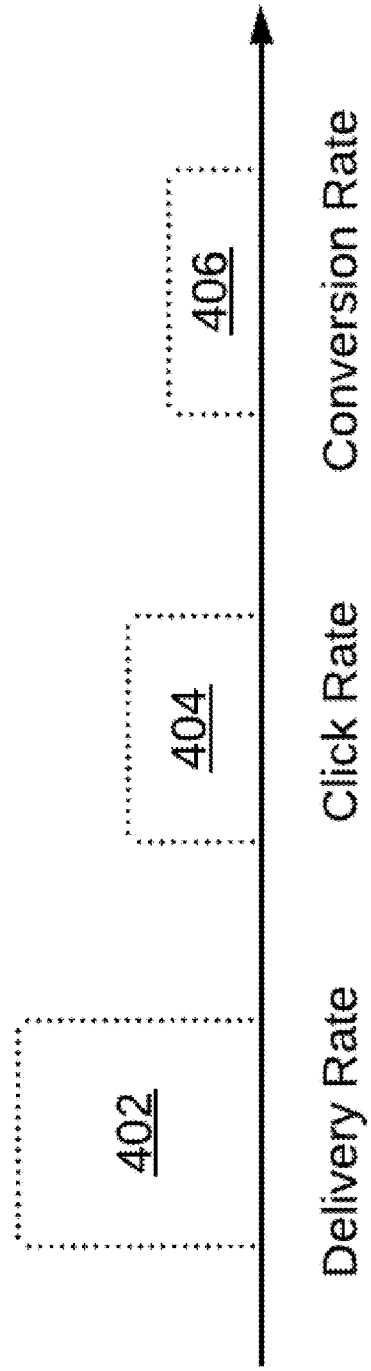
FIG. 4A shows an exemplary report of a first communication, according to one or more embodiments of the present subject matter.
Figure 4B:
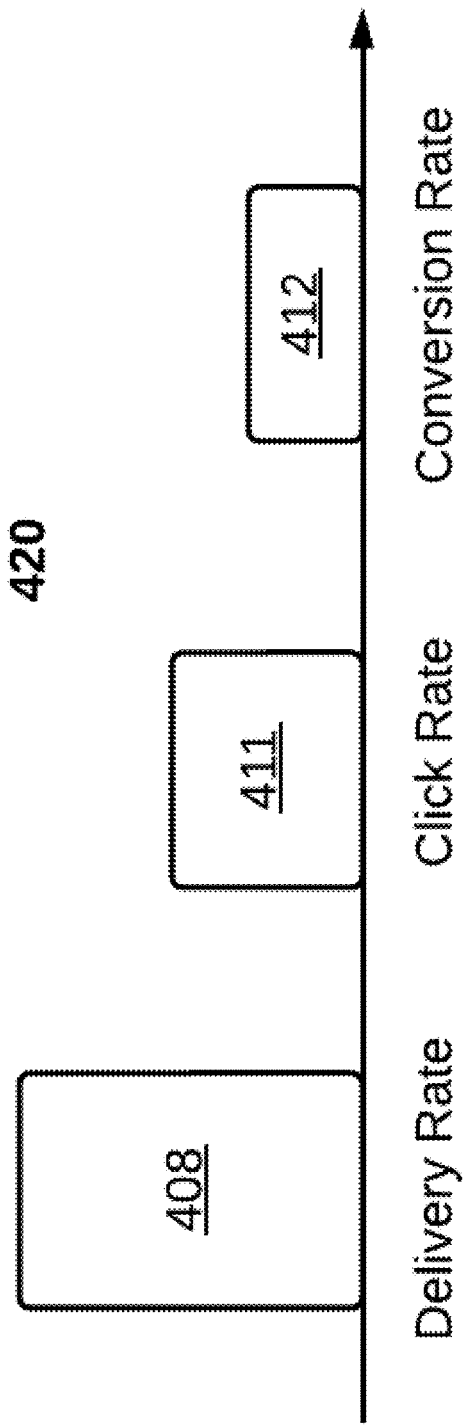
FIG. 4B shows an exemplary report of a second communication, according to one or more embodiments of the present subject matter.

FIGS. 4A and 4B show exemplary reports of a first communication and a second communication, according to one or more embodiments of the present subject matter. As shown in FIG. 4A, the first communication's breakdown report, i.e., first communication summary 410, can comprise a visualized graph such as a bar chart, which can include the communication's delivery rate 402, click rate 404 and conversion rate 406. The first communication's breakdown report can be based on the first communication database as described herein. A bar chart can be useful for comparing data across different engagement metric areas. In addition to the bar chart, other visualization frameworks can also be adopted, for example, a line chart breakdown report, or a hybrid of several tools. As shown in FIG. 4B, second communication's breakdown report, i.e., the linked second communication summary 420, can comprise a visualized graph such as a bar chart, which can include the communication's delivery rate 408, click rate 411, and conversion rate 412. Similarly, the second communication's breakdown report can be based on the second communication database.

Figure 4C:
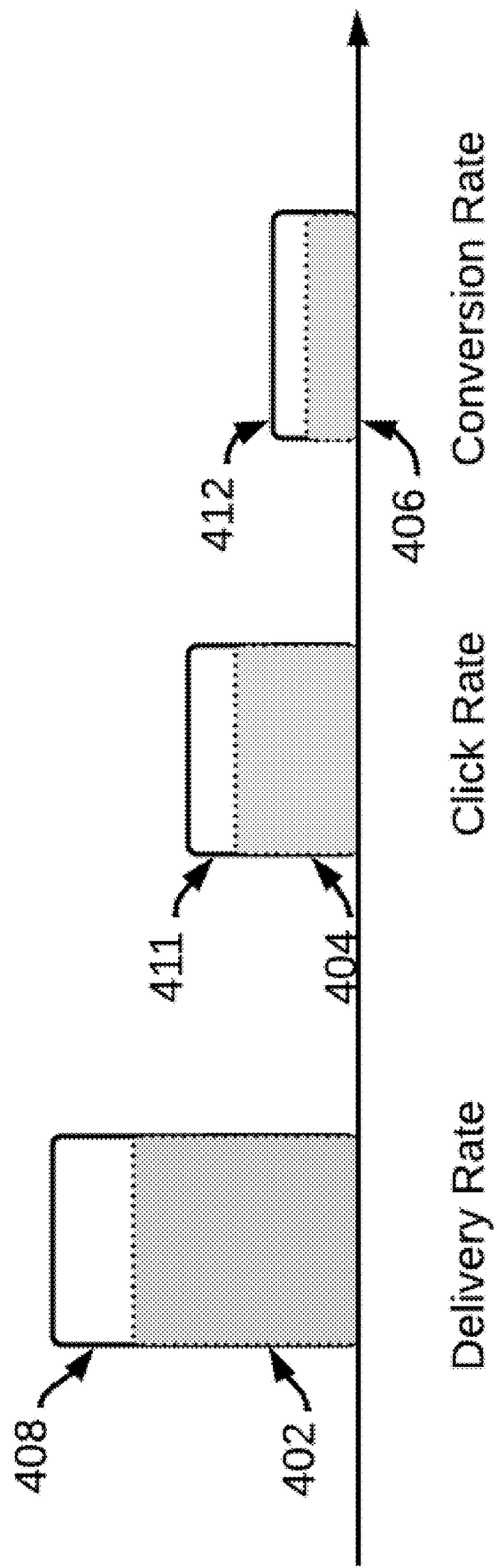
FIG. 4C shows an exemplary combined report of a multi-channel communication comprising the first communication and the second communication, according to one or more embodiments of the present subject matter.

FIG. 4C shows an exemplary combined report of a multi-channel communication comprising the first communication and the second communication, according to one or more embodiments of the present subject matter. This comprehensive combined report of the multi-channel communication, i.e., the multi-channel communication summary 430, can incorporate a comparative bar chart that displays the respective delivery rate, click rate, and conversion rate of both communications.

According to some embodiments, depending on one or more comparative metrics, the system can propose modifications for the subsequent communication within a specific channel. These proposals may be associated with the communication content and/or the configuration of the content. Upon receiving these suggestions, a communication manager can enact these recommended changes to enhance the upcoming communication. In addition, according to some embodiments, the system can autonomously fine-tune certain aspects of a communication based on the comprehensive multi-channel communication summary and the proposed modifications.

Figure 5:
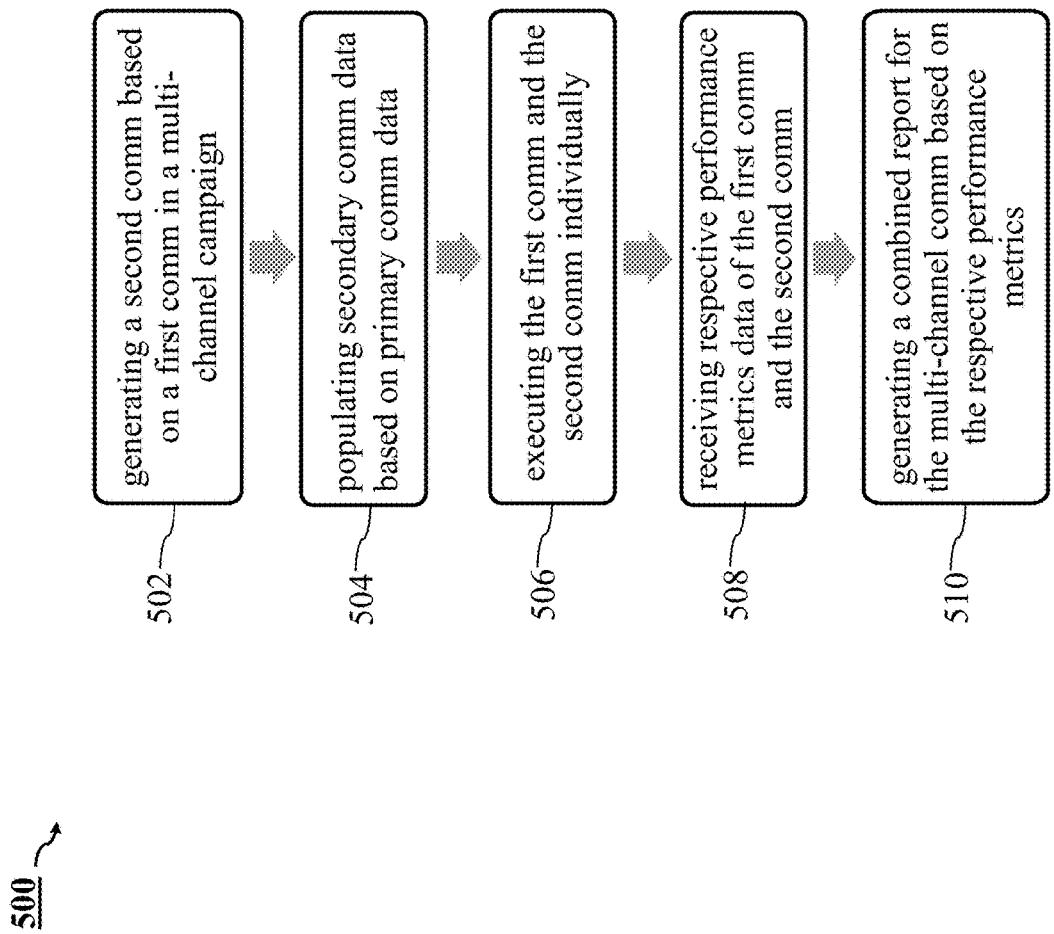
FIG. 5 shows some exemplary processes of a multi-channel communication system, according to one or more embodiments of the present subject matter.

FIG. 5 shows some exemplary processes 500 of a multi-channel communication system, according to one or more embodiments of the present subject matter. At step 502, the multi-channel communication system can generate, at a communication management server, a second communication based on a first communication in the multi-channel communication. Each of the first communication and the second communication is associated with a separate communication channel.

At step 504, the multi-channel communication system can populate secondary communication data of the second communication based on primary communication data of the first communication. According to some embodiments, the primary communication data comprise primary content and primary settings. Examples of the content data comprise subject lines, communication content, preview texts, etc. Examples of the setting data comprise communication names, segmentation information, communication tags, sending time, tracking settings, etc. The secondary communication data comprise secondary content and secondary settings. According to some embodiments, the secondary content can comprise secondary preview texts for the second communication. According to some embodiments, the secondary content can comprise a secondary subject line for the second communication.

According to some embodiments, the secondary content generated by the system can be an adaptation of the primary content. For example, adaptation models associated with the system can generate adjusted and/or enhanced secondary content based on the primary content. According to some embodiments, the system can select important information from the primary communication data and display it in the secondary communication data. For example, the system can determine an essential link, e.g., an information link, in the primary communication data and embed it in the secondary communication data. According to some embodiments, adaptation models can shorten or expand the secondary communication content data from the primary communication data. According to some embodiments, adaptation models can translate primary communication data in a first language into a second language in a second communication.

According to some embodiments, the multi-channel communication system can assign a first universal identification number stored in the first communication database for the first communication, assign a second universal identification number stored in the second communication database for the second communication, and generate a database link between the first communication database and the second communication database. The database link can be further assigned a link identification number. Furthermore, the system can store the first universal identification number, the second universal identification number, and the link identification number in a communication link database.

At step 506, the multi-channel communication system can execute, individually, the first communication and the second communication. At step 508, the multi-channel communication system can receive respective performance metrics associated with the first communication and the second communication. For example, one or more tracking and analytic tools can track the open and click rate of an email or a SMS message over a predetermined amount of time. The engagement metrics can be stored in the corresponding individual communication database. According to some embodiments, for each communication, the system can generate an individual breakdown report via various database management system such as MySQL. According to some embodiments, the linked communication be two or more linked communications.

At step 510, the multi-channel communication system can generate a combined report for the multi-channel communication based on the respective performance metrics. According to some embodiments, upon receiving a request to remix the two or more linked communications, the system can first confirm that the two or more communication result data can be remixed and combined based on their compatibility. For example, an Email communication and its linked SMS communication or a push notification communication can be remixed because its engagement metrics are similar and comparable. Conversely, an Email communication and its linked video marketing communication are difficult to be compared. To achieve this, the system can retrieve remix initializer data, via retrieving the primary communication initializer data and secondary communication initializer data. Next, the system can determine whether such retrieved data from the two linked channels can be remixed and combined, for example, the determination process can compare the respective communication content and settings and decide whether they are compatible and comparable. After remix confirmation, the system can call for accessing the communication link database. Upon receiving the database link data, the system can remix the primary communication data and the second communication data. According to some embodiment, the primary communication handler and the secondary communication handler can respectively retrieve and process the relevant communication data such as engagement metrics including open rate, click rate, conversion rate, and revenue. The combined report can be rendered via various frameworks to visualize data, for example, a bar chart or a line chart or a hybrid of different types.

According to some embodiments, various data fields can be added or removed in the combined report. The system can highlight key engagement metrics and also make adjustment suggestions based on the combined report. For example, based on a lower-than-expected click rate of the SMS communication, the system can recommend changing the delivery time of the next SMS communication to be ahead of the linked Email communication. In addition, the system can recommend shortening or altering an email content when the click rate of an email communication is lower than a predetermined threshold. These suggestions can be related to the communication content and/or content settings. Following receiving these suggestions, a communication manager can implement these adjustment suggestions to optimize the next communication. In addition, according to some embodiments, the system can automatically optimize certain aspects of a communication based on the multi-channel communication summary and suggested adjustments of the system.

Figure 6:
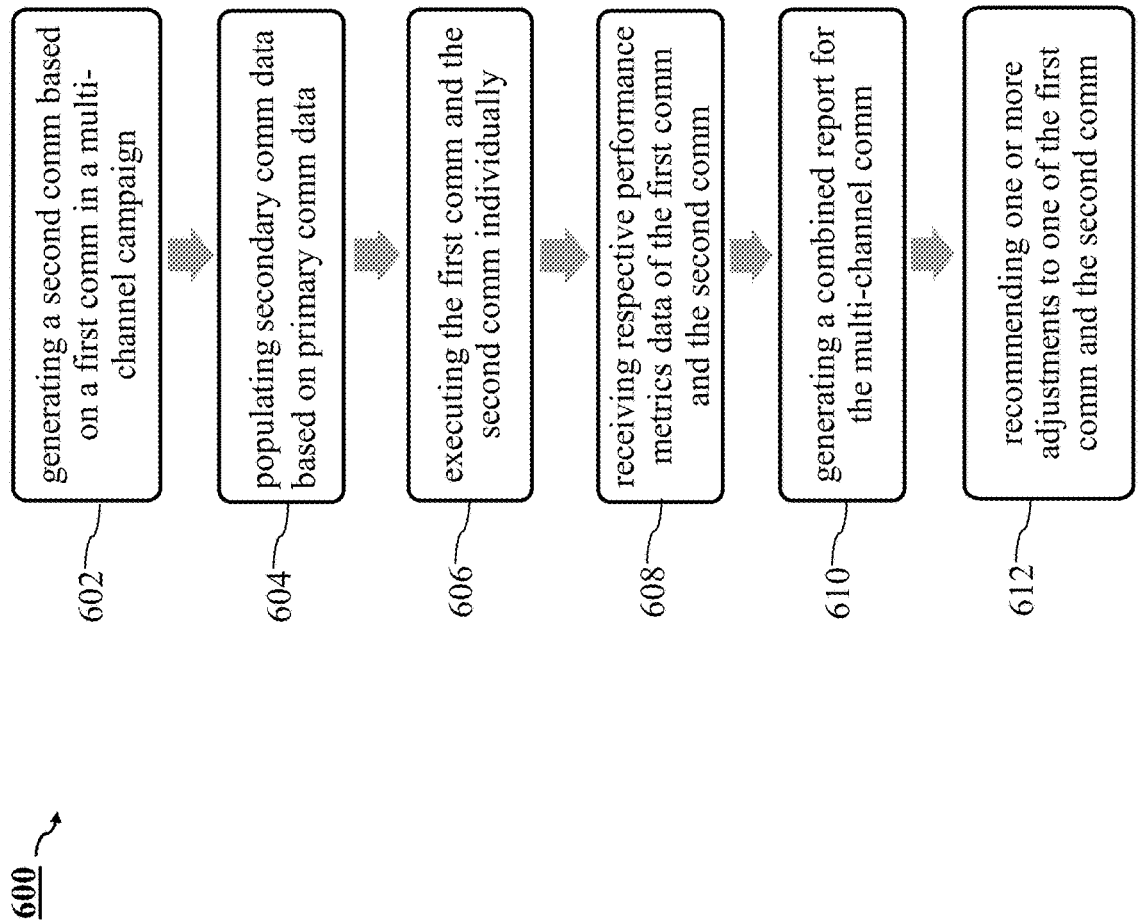
FIG. 6 shows some exemplary processes of a multi-channel communication system, according to one or more embodiments of the present subject matter.

FIG. 6 shows some exemplary processes 600 of a multi-channel communication system, according to one or more embodiments of the present subject matter. At step 602, the multi-channel communication system can generate a second communication based on a first communication in a multi-channel communication, wherein each of the first communication and the second communication is associated with a respective communication channel. This way, the system can efficiently create a second, linked communication based on the content and settings of the first communication.

At step 604, the multi-channel communication system can populate secondary communication data of the second communication based on primary communication data of the first communication. According to some embodiments, the system can populate and adjust data for a second communication database by utilizing a first and linked communication database. Each database corresponds to a separate communication channel. Furthermore, the system can assign a unique identification number to each communication for efficient management across multiple channels. The communication manager has the flexibility to modify the content and settings of the second communication database as required. Additionally, in alternate embodiments, the system can automatically adjust the content and settings of the second database in accordance with the objectives and demands of the second communication.

At step 606, the multi-channel communication system can execute, individually, the first communication and the second communication. At step 608, the multi-channel communication system can receive respective performance metrics associated with the first communication and the second communication. The system can track and record the engagement metrics of the linked yet separate communications via various mechanisms. For example, one or more tracking and analytic tools can track the open and click rate of an email or a SMS message over a predetermined amount of time. The engagement metrics can be stored in respective communication databases of the communications. According to some embodiments, for each communication, the system can generate an individual breakdown report based its engagement metrics. The breakdown report can also be rendered via various frameworks to visualize data, for example, a bar chart or a line chart breakdown report, or a hybrid of different types.

At step 610, the multi-channel communication system can generate a combined report for the multi-channel communication based on the respective performance metrics. Upon confirming that the engagement metrics can be compatible and compared, the system can call for communication link service for accessing the communication link database. Upon receiving the database link data, e.g. first communication UUID, second communication UUID, and communication link UUID, the system can remix the primary communication data and the second communication data, via implementing primary communication handler and secondary communication handler. According to some embodiment, the primary communication handler and the secondary communication handler can respectively retrieve and process the relevant communication data such as engagement metrics including open rate, click rate, conversion rate, and revenue.

At step 612, the multi-channel communication system can recommend one or more adjustments to one of the first communication and the second communication. According to some embodiments, the system can highlight key engagement metrics and also make adjustment suggestions based on the combined report. For example, based on a lower-than-expected click rate of the SMS communication, the system can recommend changing the delivery time of the next SMS communication to be ahead of the linked Email communication. In addition, the system can recommend shortening or altering email content when the click rate of an email communication is lower than a predetermined threshold. According to some embodiments, the system can automatically implement a number of recommended optimization changes in content or settings for the one or more of the communication.

Figure 7A:
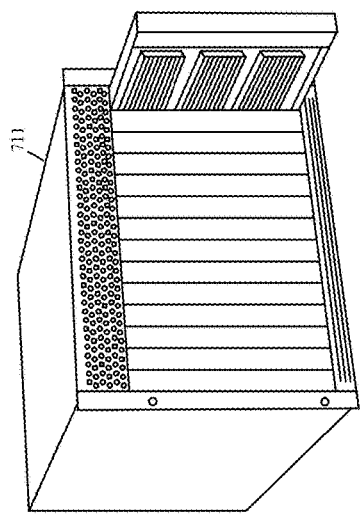
FIG. 7A shows a server system of rack-mounted blades, according to one or more embodiments of the present subject matter.

FIG. 7A shows a server system of rack-mounted blades for implementing the present subject matter. Various examples are implemented with cloud servers, such as ones implemented by data centers with rack-mounted server blades. FIG. 7A shows a rack-mounted server blade multi-processor server system 711. Server system 711 comprises a multiplicity of network-connected computer processors that run software in parallel.

Figure 7B:
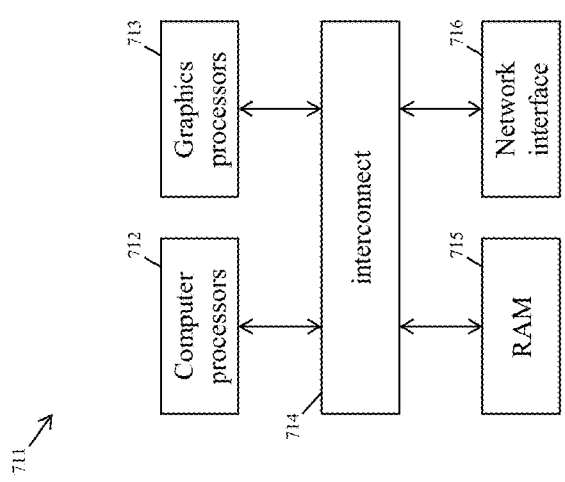
FIG. 7B shows a diagram of a networked data center server, according to one or more embodiments of the present subject matter.

FIG. 7B shows a diagram of a server system 711. It comprises a multicore cluster of computer processors (CPU) 712 and a multicore cluster of graphics processors (GPU) 713. The processors connect through a board-level interconnect 714 to random-access memory (RAM) devices 715 for program code and data storage. Server system 711 also comprises a network interface 716 to allow the processors to access the Internet, non-volatile storage, and input/output interfaces. By executing instructions stored in RAM devices 715, the CPUs 712 and GPUs 713 perform steps of methods described herein.

Figure 8A:
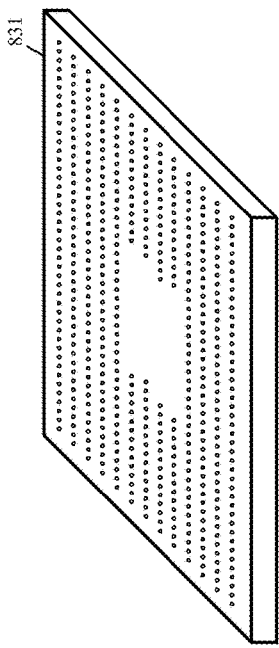
FIG. 8A shows a packaged system-on-chip device, according to one or more embodiments of the present subject matter.

FIG. 8A shows the bottom side of a packaged system-on-chip device 831 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 8B:
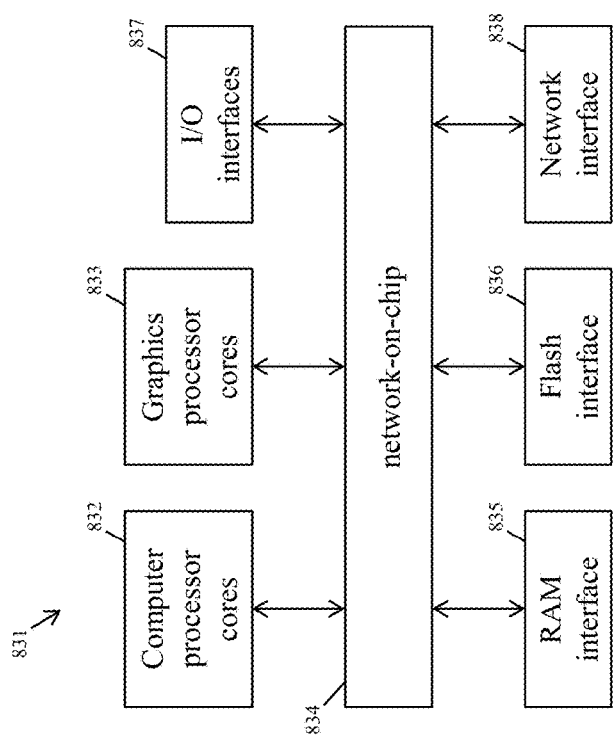
FIG. 8B shows a block diagram of a system-on-chip, according to one or more embodiments of the present subject matter.

FIG. 8B shows a block diagram of the system-on-chip 831. It comprises a multicore cluster of computer processor (CPU) cores 832 and a multicore cluster of graphics processor (GPU) cores 833. The processors connect through a network-on-chip 834 to an off-chip dynamic random access memory (DRAM) interface 835 for volatile program and data storage and a Flash interface 836 for non-volatile storage of computer program code in a Flash RAM non-transitory computer readable medium. SoC 831 also has a display interface for displaying a graphical user interface (GUI) and an I/O interface module 837 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 831 also comprises a network interface 838 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 835 or Flash devices through interface 836, the CPU cores 832 and GPU cores 833 perform functionality as described herein.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Several aspects of implementations and their applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method for creating a multi-channel digital communication, comprising:

training an adaptation model to perform text generation or adjustment using datasets, wherein the training comprises tokenizing content of the datasets into tokens, mapping the tokens into vector embeddings, and inputting the vector embeddings into the adaptation model;

generating, at a communication management server, a second communication based on a first communication in the multi-channel communication, wherein the first communication is associated with a different channel than the second communication;

assigning a first universal identification number to the first communication in a first communication database;

assigning a second universal identification number to the second communication in a second communication database;

generating a database link between the first communication database and the second communication database based on the first universal identification number and the second universal identification number;

storing the database link in a communication link database separate from the first communication database and the second communication database, wherein the database link is further assigned a link identification number;
populating, via the adaptation model, secondary communication data of the second communication based on primary communication data of the first communication;
executing the first communication to a first plurality of recipients and the second communication to a second plurality of recipients;
tracking and storing performance metrics arising from executing the first communication and second communication, wherein the performance metrics comprise at least one of a delivery rate, click rate and conversion rate;
comparing content and settings of the first communication and content and settings of the second communication for compatibility;
requesting, if the content and settings of the first communication are compatible with the content and settings of the second communication, the respective performance metrics associated with the first communication and the second communication from the first communication database and the second communication database;
generating a combined report for the multi-channel communication based on the link identification number in order to extract the respective performance metrics from the first communication database and the second communication database; and
implementing one or more adjustments, via the adaptation model, to one of the first communication and the second communication based on the combined report.

2. The computer-implemented method of claim 1, further comprising: storing the primary communication data in a first communication database; and storing the secondary communication data in a second communication database.

3. The computer-implemented method of claim 2, further comprising: storing the respective performance metrics in the first communication database and the second communication database.

4. The computer-implemented method of claim 1, further comprising: highlighting key performance metrics and recommending, by the communication management server, one or more adjustments to one of the first communication and the second communication.

5. The computer-implemented method of claim 1, wherein the first communication is an email and the second communication is a short message service or push-type notification.

6. The computer-implemented method of claim 1, wherein the one or more adjustments comprise altering content or delivery time of a subsequent communication.

7. A computer-implemented method for creating a multi-channel digital communication, comprising:
training an adaptation model to perform text generation or adjustment using datasets, wherein the training comprises tokenizing content of the datasets into tokens, mapping the tokens into vector embeddings, and inputting the vector embeddings into the adaptation model;
generating, at a communication management server, a second communication based on a first communication in a multi-channel communication, wherein each of the first communication and the second communication is associated with a respective communication channel;
assigning a first universal identification number to the first communication;
assigning a second universal identification number to the second communication;
generating a database link between a first communication database and a second communication database based on the first universal identification number and the second universal identification number;
assigning a link identification number to the database link;
executing the first communication to a first plurality of recipients and the second communication to a second plurality of recipients;
compiling respective breakdown reports based on performance metrics of the first communication and the second communication by retrieving the performance metrics corresponding to the first communication and the second commination from the first communication database and the second communication database, respectively, and wherein the performance metrics comprise at least one of a delivery rate, click rate and conversion rate;
comparing the respective breakdown reports of the first communication and the second communication for compatibility;
generating a combined report for the multi-channel communication based on the link identification number in order to extract the respective performance metrics from the first communication database and the second communication database;
evaluating the combined report for whether a key performance metric is lower than expected;
identifying in a user interface one or more setting or content adjustments to one of the first communication and the second communication if the key performance metric is lower than expected; and
implementing the content and setting adjustments, via the adaptation model, to at least one of a next first communication and a next second communication to increase the key performance metric of the next first communication and the next second communication.

8. The computer-implemented method of claim 7, further comprising:
storing primary communication data of the first communication in the first communication database; and
storing secondary communication data of the second communication in the second communication database.

9. The computer-implemented method of claim 8, further comprising: populating the secondary communication data of the second communication based on the primary communication data of the first communication.

10. The computer-implemented method of claim 8, further comprising: storing the performance metrics in the first communication database and the second communication database.

11. The computer-implemented method of claim 7, wherein the first communication is an email and the second communication is a short message service or push-type notification.

12. The computer-implemented method of claim 7, wherein the one or more adjustments comprise altering content or delivery time of a subsequent communication.

13. A multi-channel digital communication system comprising:
an adaptation model for performing data generation or adjustment, wherein the adaptation model is trained by tokenizing content of datasets into tokens, mapping the tokens into vector embeddings, and inputting the vector embeddings into the adaptation model;

a first communication database associated with a first channel for managing digital communication services for the first channel;

a second communication database associated with a second channel different in modality than the first channel and for managing digital communication services for the second channel;

a communication link database operable to link a first communication in the first communication database to a second communication in the second communication database; and a digital communication management server operable to communicate between the first communication database, second communication database, and communication link database; wherein the system comprises:

memory storing instructions that are executable; and one or more processing devices to execute the instructions to perform operations comprising:

assigning a first universal identification number to the first communication;

assigning a second universal identification number to the second communication;

generating, based on the first universal identification number and the second universal identification number, a database link between the first communication database and the second communication database;

assigning a link identification number to the database link;

generating a second communication based on a first communication in a multi-channel digital communication, wherein each of the first communication and the second communication is associated with a respective communication channel;

populating, via the adaptation model, secondary communication data of the second communication based on primary communication data of the first communication;

executing the first communication to a first plurality of recipients and the second communication to a second plurality of recipients;

tracking and storing performance metrics arising from executing the first communication and second communication in the first communication database and the second communication database, respectively, wherein the performance metrics comprise at least one of a delivery rate, click rate and conversion rate;

comparing content and settings of the first communication and content and settings of the second communication for compatibility;

requesting, if the content and settings of the first communication are compatible with the content and settings of the second communication, the respective performance metrics associated with the first communication and the second communication from the first communication database and the second communication database;

generating a combined report for the multi-channel communication based on the link identification number in order to extract the respective performance metrics from the first communication database and the second communication database; and implementing one or more adjustments, via the adaptation model, to one of the first communication and the second communication based on the combined report.

14. The system of claim 13, wherein the operations further comprise:

highlighting key performance metrics and recommending one or more adjustments to one of the first communication and the second communication based on the combined report.

15. The system of claim 13, wherein the first communication is an email and the second communication is a short message service or push-type notification.

16. The system of claim 13, wherein the one or more processing devices are further operable to: evaluate the combined report for whether a key performance metric is lower than expected.

17. The system of claim 13, wherein the one or more adjustments comprise altering content or delivery time of a subsequent communication.

* * * * *